United States Patent
McClelland

(10) Patent No.: US 7,388,345 B2
(45) Date of Patent: Jun. 17, 2008

(54) ROTOR POSITION DETECTION IN AN ELECTRICAL MACHINE

(75) Inventor: Michael Leo McClelland, Leeds (GB)

(73) Assignee: Switched Reluctance Drives Limited, Harrogate, North Yorkshire (GB)

(*) Notice: Subject to any disclaimer, the term of this patent is extended or adjusted under 35 U.S.C. 154(b) by 0 days.

(21) Appl. No.: 11/522,103

(22) Filed: Sep. 15, 2006

(65) Prior Publication Data
US 2007/0075672 A1 Apr. 5, 2007

(30) Foreign Application Priority Data
Oct. 4, 2005 (GB) .................... 0520178.5

(51) Int. Cl.
H02P 25/08 (2006.01)
(52) U.S. Cl. .................... 318/701; 318/254
(58) Field of Classification Search ............ 318/138, 318/254, 439, 701, 720–724
See application file for complete search history.

(56) References Cited

U.S. PATENT DOCUMENTS

| | | | |
|---|---|---|---|
| 3,706,923 A * | 12/1972 | Dunfield | 318/254 |
| 3,979,651 A * | 9/1976 | Bringol | 318/138 |
| 4,713,594 A * | 12/1987 | Bose et al. | 318/685 |
| 5,373,206 A * | 12/1994 | Lim | 310/68 B |
| 5,652,494 A | 7/1997 | Sugden | |
| 6,002,234 A * | 12/1999 | Ohm et al. | 318/729 |
| 6,774,592 B2 * | 8/2004 | Walters et al. | 318/254 |
| 6,909,256 B2 * | 6/2005 | Itabashi | 318/685 |
| 7,002,318 B1 * | 2/2006 | Schulz et al. | 318/782 |
| 2003/0030406 A1 | 2/2003 | Takahashi et al. | |
| 2005/0012486 A1 | 1/2005 | Crain et al. | |

FOREIGN PATENT DOCUMENTS

| | | |
|---|---|---|
| EP | 0573198 A1 | 12/1993 |
| EP | 1109308 A2 | 6/2001 |
| WO | WO-91/02401 A1 | 2/1991 |

OTHER PUBLICATIONS

Miller, TJE, "Electronic Control of Switched Reluctance Machines," Newnes, Power Engineering Series, Great Britain, 2001, 2 title pages and pp. 92-97.
Stephenson, et al., "The Characteristics, Design and Applications of Switched Reluctance Motors and Drives," PCIM '93 Conference & Exhibition, Nürnberg, Germany, Jun. 21-24, 1993, Title page and pp. 1-31 and 33-68.
Ray, et al., "Sensorless Methods for Determining the Rotor Position of Switched Reluctance Motors," The European Power Electronics Association, 1993, pp. 7-13.
Mvungi, et al., "Accurate Sensorless Rotor Position Detection in an SR Motor," The European Power Electronics Association Firenze, 1991, pp. 76-79.
Search Report issued by the European Patent Office for European Patent Application No. 06255095.9, dated Dec. 22, 2006 (5 pages).

* cited by examiner

*Primary Examiner*—Bentsu Ro
(74) *Attorney, Agent, or Firm*—Haynes and Boone, LLP

(57) ABSTRACT

An electrical machine is controlled with a combination of a physical rotor position transducer and a software position detection algorithm. The physical transducer has a reduced number of sensors, so that it will only give accurate information at high speeds. The software algorithm is executed by a low-cost processor which cannot provide sufficient information at high speeds. The controller blends the information from the two position detectors to produce an economic drive which operates over a large speed range.

14 Claims, 4 Drawing Sheets

ROTOR POSITION DETECTION IN AN ELECTRICAL MACHINE

This invention relates to rotor position detection in electrical machines, particularly in switched reluctance machines.

A general treatment of switched reluctance drives can be found in various textbooks, e.g. "Electronic Control of Switched Reluctance Machines" by TJE Miller, Newnes, 2001 which is incorporated herein by reference. Further details of the control and operation of these systems are described in the paper "The Characteristics, Design and Applications of Switched Reluctance Motors and Drives" by J. M. Stephenson and R. J. Blake delivered at the PCIM'93 Conference and Exhibition held in Nurnberg, Germany, 21-24 Jun. 1993, which is incorporated herein by reference. In that paper the "chopping" and "single-pulse" modes of energisation of switched reluctance machines are described for operation of the machine at low and high speeds, respectively.

A typical prior art drive is shown schematically in FIG. 1. This includes a DC power supply 11 that can be, for example, a battery or rectified and filtered AC mains. The DC voltage provided by the power supply 11 is switched across phase windings 16 of the motor 12 by a power converter 13 under the control of the electronic control unit 14. One of the many known converter topologies is shown in FIG. 2, in which the phase winding 16 of the machine is connected in series with two switching devices 21 and 22 across the busbars 26 and 27. Busbars 26 and 27 are collectively described as the "DC link" of the converter. Energy recovery diodes 23 and 24 are connected to the winding to allow the winding current to flow back to the DC link when the switches 21 and 22 are opened. A capacitor 25, known as the "DC link capacitor", is connected across the DC link to source or sink any alternating component of the DC link current (i.e. the so-called "ripple current") which cannot be drawn from or returned to the supply. In practical terms, the capacitor 25 may comprise several capacitors connected in series and/or parallel. Where parallel connection is used, some of the elements may be distributed throughout the converter. A resistor 28 can be connected in series with the lower switch 22 to provide a current feedback signal. A multiphase system typically uses several "phase legs" of FIG. 2 connected in parallel to energise the phases of the electrical machine.

The performance of a switched reluctance machine is greatly dependent on the accurate timing of phase energisation with respect to rotor position. Detection of rotor position is conventionally achieved by using a transducer 15, shown schematically in FIG. 1, such as a rotating toothed disk mounted on the machine rotor, which co-operates with a set of optical, magnetic or other sensors mounted on the stator. FIG. 3 shows a typical arrangement for a 3-phase system using a 4-pole rotor. A signal indicative of rotor position relative to the stator is generated by each sensor as shown in FIG. 4. These signals may be combined as shown and supplied to control circuitry so that accurate phase energisation may be achieved. U.S. Pat. No. 5,652,494 (Sugden) discloses a method of using these signals to trigger digital ramps, from which the correct instants for energisation and de-energisation may be determined. This system is simple and, provided the rotor speed is high enough, works well in many applications. However, the need for a sensor for each phase can complicate the mechanical layout and design of small systems, as space must be found to position each sensor at the correct location arranged circumferentially around the disc, and the sensors cannot be miniaturised without incurring extra cost. Another drawback of this arrangement is that is has limited angular resolution, which may lead to generation of torque ripple at low speeds.

Various methods have been proposed for dispensing with the rotor position transducer ("rpt") and using a position detection algorithm running in a software controller. Several of these methods are reviewed in "Sensorless Methods for Determining the Rotor Position of Switched Reluctance Motors" by W F Ray and I H Al-Bahadly, published in the Proceedings of The European Power Electronics Conference, Brighton, UK, 13-16 Sep. 1993, Vol. 6, pp 7-13 which is incorporated herein by reference. Many of these methods use the measurement of phase flux-linkage (i.e. the integral of applied voltage with respect to time) and current (e.g. as derived from a current transducer 18 in FIG. 1) in one or more phases. Position is calculated using knowledge of the variation in inductance of the machine as a function of angle and current. This characteristic can be stored as a flux-linkage/angle/current table and is depicted graphically in FIG. 5. The storage of this data is a disadvantage as it involves the use of a large memory array and/or additional system overheads for interpolation of data between stored points.

Some methods make use of this data at low speeds where "chopping" current control is the dominant control strategy for varying the developed torque. These methods usually employ diagnostic pulses in non-torque-productive phases. A method suited to low-speed operation is that proposed by N. M. Mvungi and J. M. Stephenson in "Accurate Sensorless Rotor Position Detection in an S R Motor", published in Proceedings of the European Power Electronics Conference, Firenze, Italy, 1991, Vol. 1, pp 390-393, incorporated herein by reference.

Other methods operate in the "single-pulse" mode of energisation at higher speeds. These methods monitor the operating voltages and currents of an active phase without interfering with normal operation. A typical higher speed method is described in International Patent Application WO 91/02401, incorporated herein by reference.

Having to store a two-dimensional array of machine data in order to operate without a rotor position transducer is an obvious disadvantage. Alternative methods have been proposed, which avoid the need for the majority of angularly referenced information and instead store data at one angle only. One such method is described in European Patent Application EP-A-0573198 (Ray), incorporated herein by reference. This method aims to sense the phase flux-linkage and current at a predefined angle by adjusting the diagnostic point in accordance with the calculated deviation away from the desired point. Flux-linkage is estimated by integrating (with respect to time) the measurement of the voltage applied to the phase. Two one-dimensional tables are stored in the preferred embodiment, one of flux-linkage versus current at a referenced rotor angle, and another of the differential of flux-linkage with respect to rotor angle versus current. By monitoring phase voltage and current, the deviation away from a predicted reference angle can be assessed, with the aid of the look-up tables, and system operation can be adjusted accordingly.

This method has been shown to be reliable, provided that the flux-linkage can be determined with sufficient accuracy whenever required by the position detection algorithm. To avoid the flux-linkage integrator drifting (due to unwanted noise in the system and imperfections in the integrator) it is set to zero at the end of each conduction cycle, when the current has fallen to zero and the phase winding is no longer linking any flux. This method is a "predictor/corrector" method, in that it initially predicts when the rotor will be at a reference position, measures parameters of the machine when it believes the reference position has been reached, and uses the results of these measurements to detect error in the prediction and hence take corrective action by adopting a new prediction for the next reference position.

While such methods are now routinely used, they generally require considerable processing capability in the controller, typically provided by a microprocessor or a digital signal processor. The cost of providing such capability is often a substantial part of the component cost of the controller, since the cycle time for processing the calculations at the highest operating speed must be significantly less than the time taken to traverse the inductance period of the machine. The speed of the processor may therefore limit the top speed of the drive unless a faster and more expensive processor is employed.

There is therefore a need for a cost-effective method of providing rotor position detection for an electrical drive which can operate over a wide speed range.

The present invention is defined in the accompanying independent claims. Some preferred features are recited in the dependent claims.

Embodiments of the invention provide an electric machine system comprising a rotor, a rotor position transducer and control means arranged to receive signals from the rotor position transducer and operable to derive rotor position information either from the signals or from a rotor position detection algorithm.

The invention is an advantageous combination of two rotor position detection techniques rendered in hardware and software, respectively. It is possible to achieve significant savings relative to the processing power that would be required if the rotor position detection algorithm were to be used exclusively.

Preferably, the duties of the hardware rotor position transducer and the software position detection algorithm are split between upper and lower speed ranges of the machine, respectively. However, a further form of the invention splits the duty for a low speed range between phases of a multiphase machine. By this technique, the rotor position transducer can be used exclusively for one phase only, thereby allowing the elimination of a current transducer for that phase.

Embodiments of the invention use a relatively low grade processor in the control means because it is now possible to limit the demands on the processor to the lower speeds. This is made possible because it is no longer necessary to provide the kind of processing speed previously necessary at the higher rotor speeds because the rpt is arranged to take over exclusive rotor position detection duty where the capabilities of the processor are unreliable.

The invention can be put into practice in a number of ways, some of which will now be described by way of example and with reference to the accompanying drawings in which.

The phase inductance cycle of a switched reluctance machine is the period of the variation of inductance for the, or each, phase, for example between maxima when the stator poles and the relevant respective rotor poles are fully aligned. The illustrative embodiment to be described uses a 3-phase switched reluctance drive in the motoring mode, but any phase number from one upwards could be used, with the drive in either motoring or generating mode.

Figure 1:
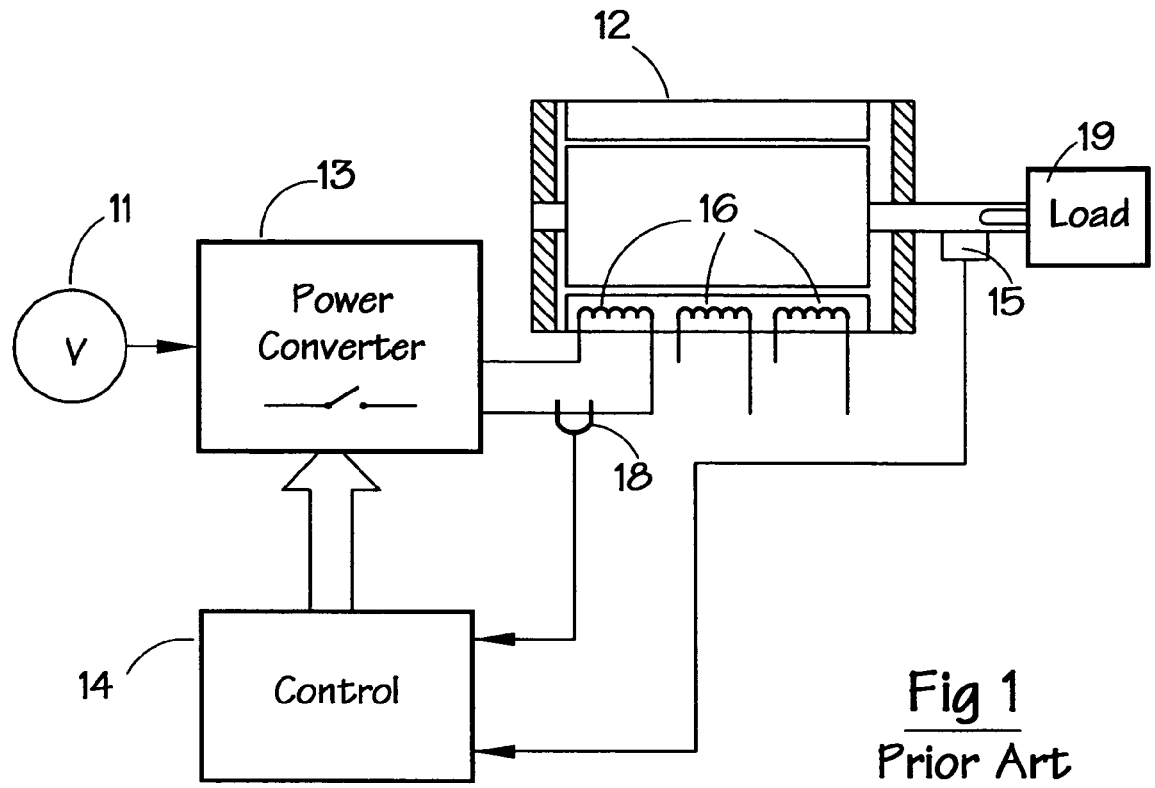
FIG. 1 shows a typical prior art switched reluctance drive.
Figure 2:
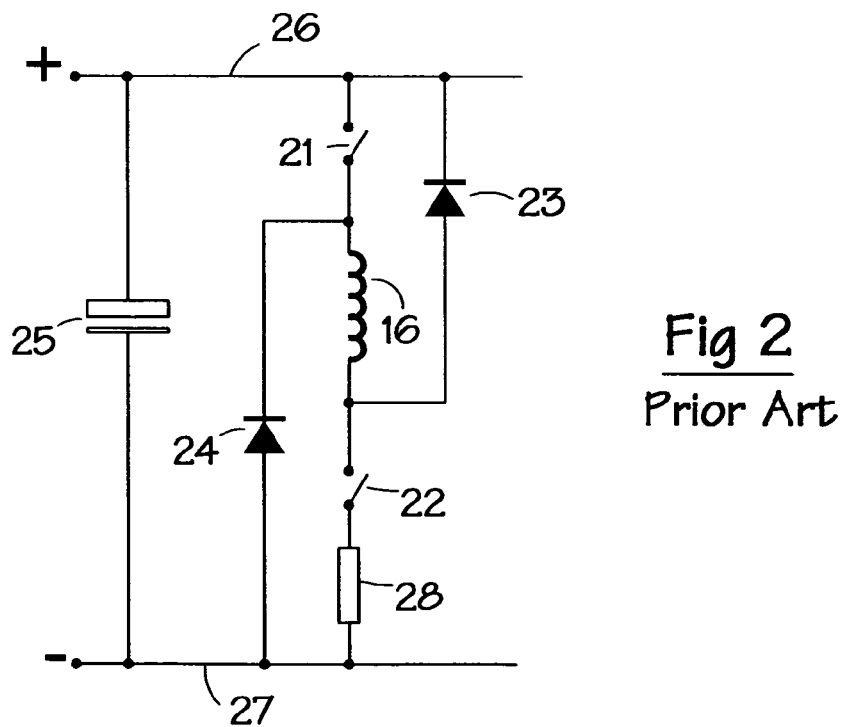
FIG. 2 shows a known topology of one phase of the converter of FIG. 1.
Figure 3:
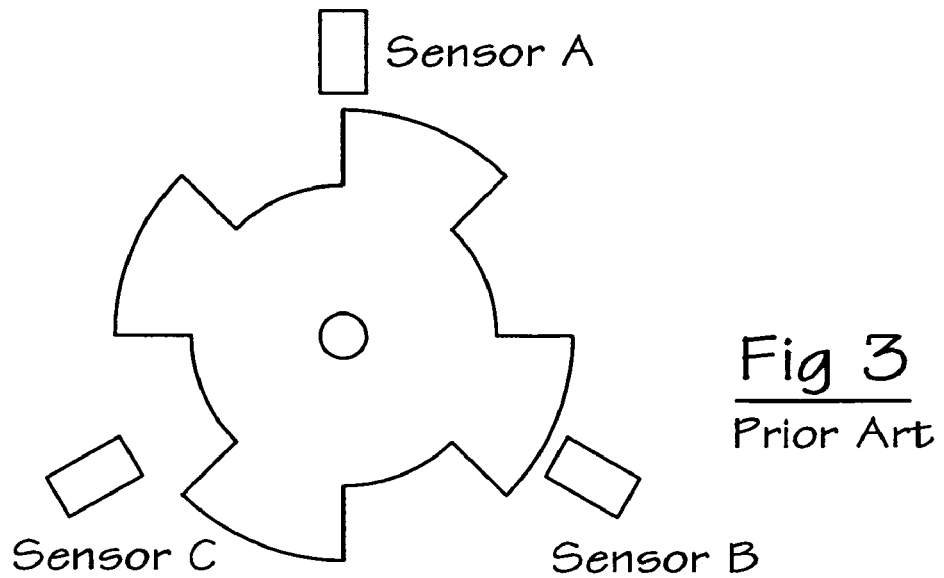
FIG. 3 shows a prior art position transducer for a 3-phase, 4-pole system.
Figure 4:
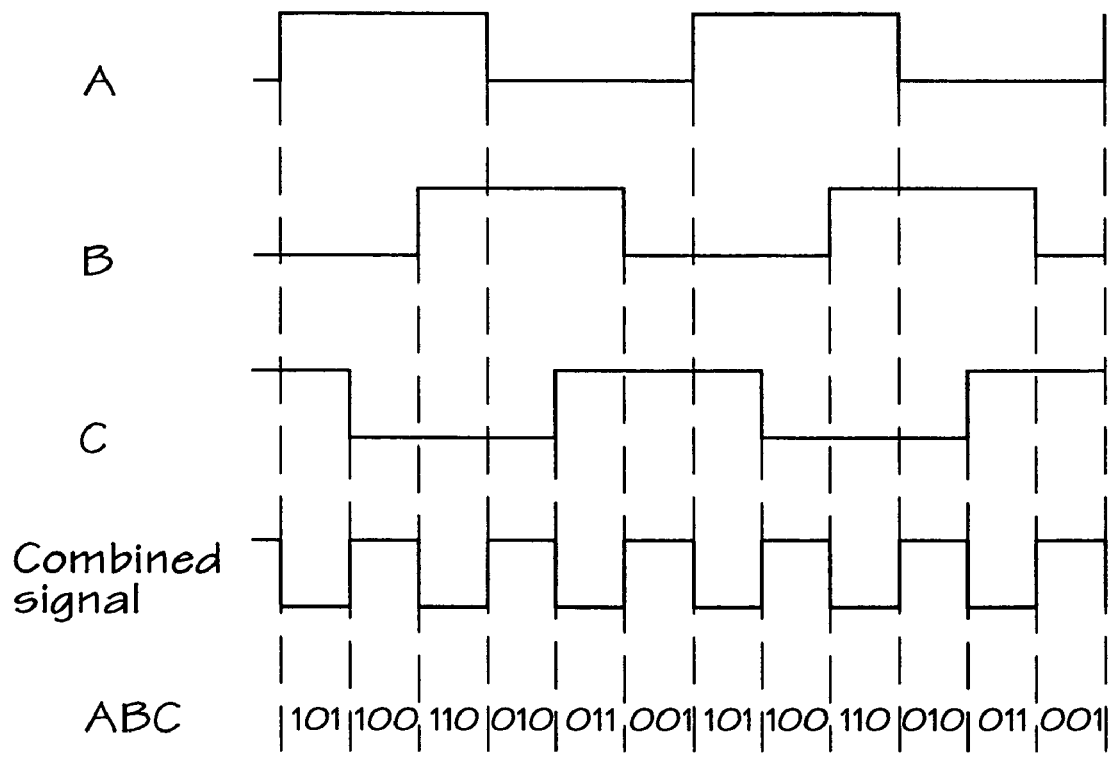
FIG. 4 shows the outputs from the transducer of FIG. 3.
Figure 5:
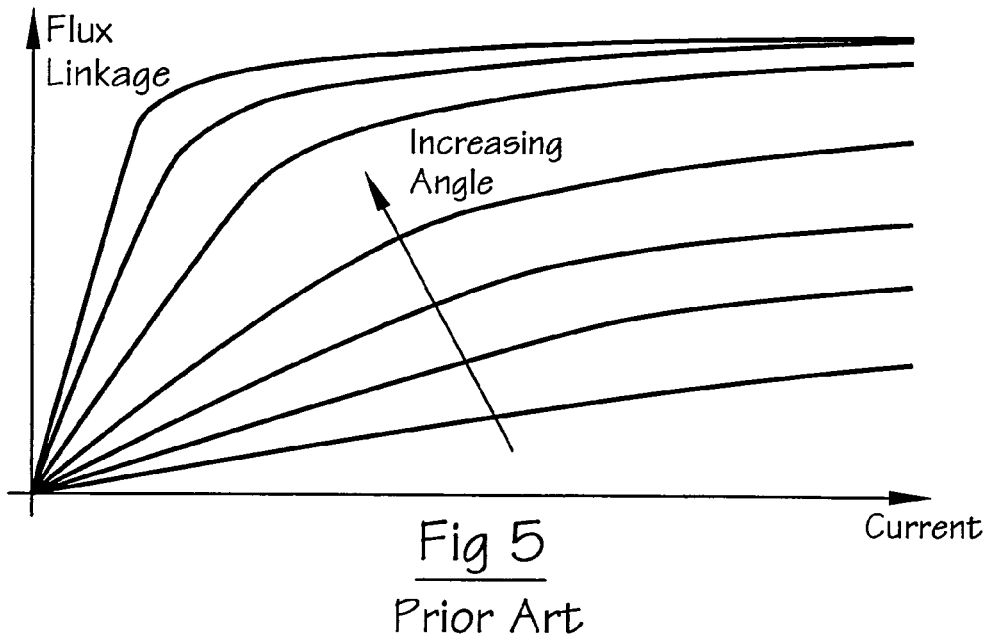
FIG. 5 shows typical flux-linkage and phase current curves, with rotor position as a parameter.
Figure 6:
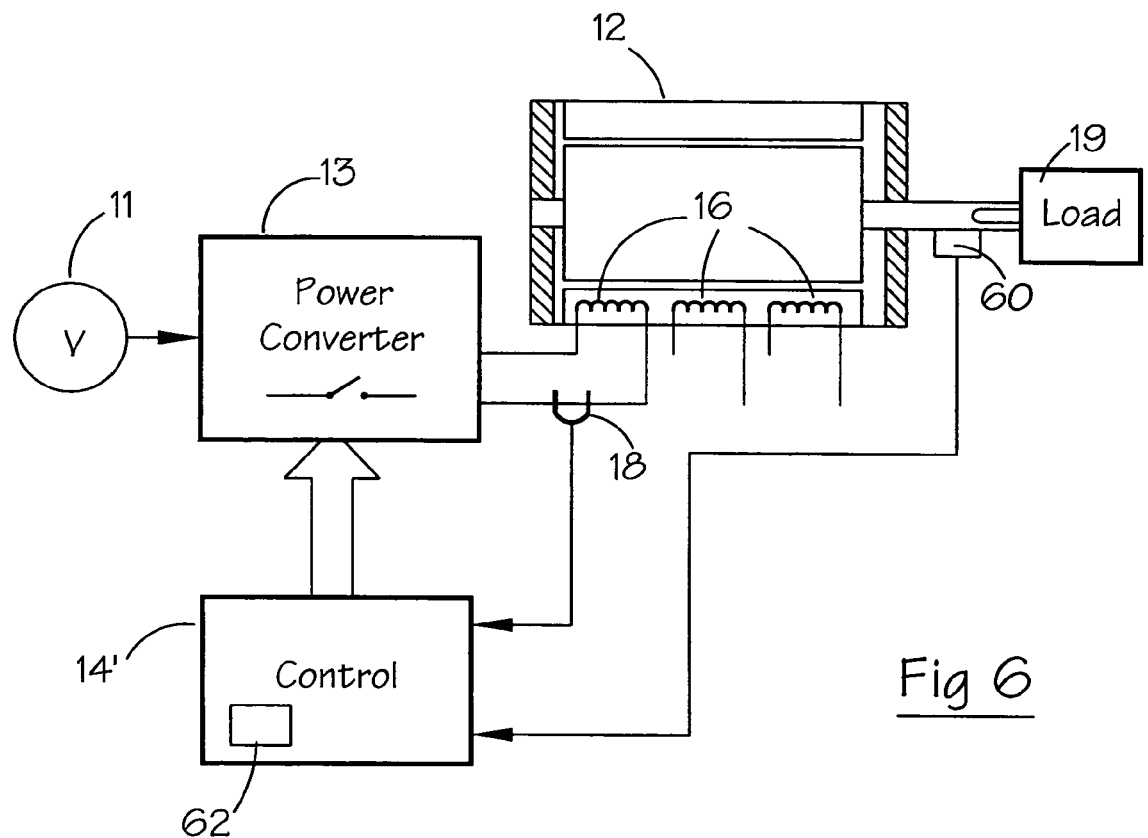
FIG. 6 shows a drive system incorporating one aspect of the invention.

FIG. 6 shows a switched reluctance drive embodying one aspect of the invention. The drive is a development of that shown in FIG. 1 and like parts are denoted by like numerals. The controller 14' has a section 62 devoted to a position detection algorithm which can operate over a part of the speed range of the motor 12. The processor embedded in section 62 is a low-cost version and cannot operate sufficiently fast to determine rotor position at the upper end of the speed range of the motor 12. In addition to the position detection algorithm, the drive has a hardware rotor position transducer 60, shown schematically in more detail in FIG. 7. Although basically similar to that shown in FIG. 3 in that it has four sets of features around the circumference of the vane 72 (to correspond to the four rotor poles of the machine), it has only one optical or magnetic sensor 70 (in the form of a switch) responsive to movement of the features. The reduced number of sensors compared to prior art arrangements gives a saving in both component cost and in space required to house the transducer. The sensor has an output as shown in FIG. 8 plotted to a base of rotor angle.

Figure 7:
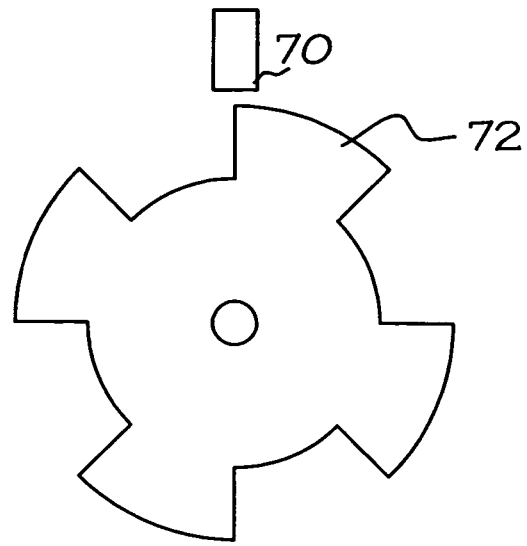
FIG. 7 shows a position transducer suitable for use with the invention.
Figure 8:
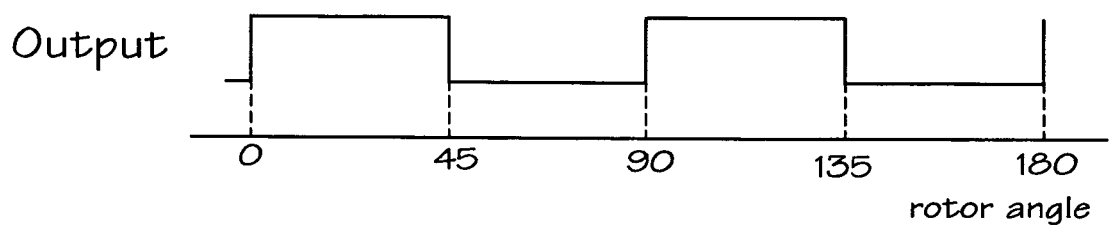
FIG. 8 shows the output from the transducer of FIG. 7.

While the signal from the transducer of FIG. 7 contains enough information to control one of the three phases in the machine, it does not have any information which relates to the other two phases. If the machine is starting from an unknown position, there is insufficient information to be able to energise the correct phase(es) to develop full torque. The same problem is present when the rotor speed is relatively low or is changing quickly—under high acceleration or deceleration a very significant change in speed can occur within half a cycle of the transducer output, which would lead to erroneous switching angles being applied to the phases.

At relatively high speeds, however, the stored energy in the rotor and any tightly coupled load prevents sudden changes of speed and it is possible then to interpolate within the period of the transducer waveform to find the expected starting points for the waveforms for the other phases. So, provided the speed is sufficiently high, a full set of transducer outputs can be synthesised, corresponding to those shown in FIG. 3. As noted above, a system like that disclosed in U.S. Pat. No. 5,652,494 (Sugden) can then be used to determine the correct switching angles for the phase(s).

The method of operation of the drive of FIG. 6 is that at zero and relatively low speeds (up to half the speed range of the drive in one embodiment) the rotor position is determined by the position detection algorithm. This can optionally incorporate torque-smoothing algorithms to minimise torque ripple. As the speed rises towards a predetermined threshold associated with a speed of the machine at which the processor of the controller is close to being unable to execute all the required operations within the inductance period, the controller checks that the hardware transducer is providing reliable rotor position information by making a comparison between the results of the hardware and software rotor position detection methods. If the comparison gives rise to results that agree within acceptable limits, the controller changes over to using hardware position detection alone. As the speed rises towards top speed, the positional information from the software detector becomes increasingly unreliable, but that is of no consequence as the duty for rotor position detection has been passed to the rpt. When the speed later falls past the threshold, the controller returns to using position information from the software detector.

Figure 9:
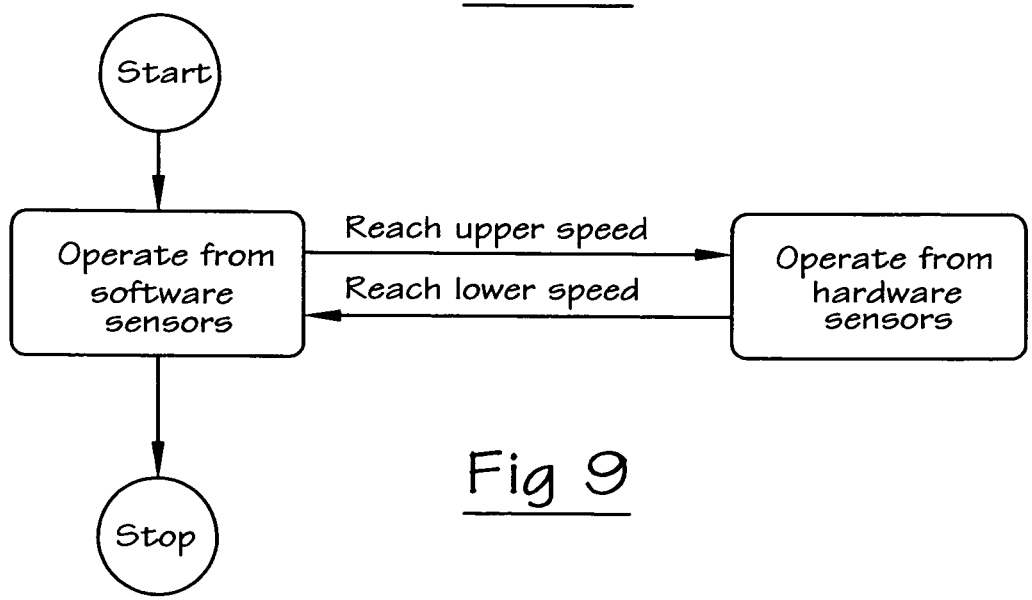
FIG. 9 shows a statechart diagram of one aspect of the invention.

In a further embodiment, hysteresis is introduced about the threshold so that the speed ranges for the two rotor position detection techniques overlap. This avoids the controller chattering between the two modes. FIG. 9 shows a suitable statechart diagram of the control actions used to implement the technique. In this way, the controller blends together the two types of detector and uses each one in the speed range where it produces acceptably accurate information.

It is counter-intuitive to provide both hardware and software position detection on a variable-speed drive system. However, by using software detection with a low-cost processor for the lower speed range and hardware detection with a single sensor for the upper speed range, embodiments of the invention provide a drive with superior performance at a lower cost than prior art systems.

A further cost saving is possible by taking advantage of the fact that the presence of the hardware rpt in one phase could allow position detection from the rpt for that phase only and thus allow the elimination of the current sensor for that phase. This is a hybrid form of the invention in which either the hardware or software are responsible for rotor position detection in a machine cycle at a low speed range. For example, a 3-phase system has a hardware rpt associated with one phase (say, Phase A) and current sensors on the other two phases (say, Phases B & C) feeding information to software position detection algorithms for these two phases. The starting and low-speed running of the machine uses information from both the hardware and software systems for different phases. At higher speeds, where the processor of the controller is unable to cope, the output of the rpt is multiplexed for the other phases as before. The skilled person will appreciate that different combinations of hardware and software detectors are possible on systems with higher phase numbers.

While the description above has been based on a drive based on a switched reluctance machine, it will be appreciated that the invention is not limited to this type of machine, but can be applied with equal benefit to any electrical drive which can operate with hardware or software position detection, e.g., drives based on induction, synchronous or permanent magnet machines.

The skilled person will also appreciate that variations of the disclosed arrangements are possible without departing from the invention, particularly in the details of the implementation of the algorithm in the controller. Accordingly, the above description of several embodiments is made by way of example and not for the purposes of limitation. It will be clear to the skilled person that minor modifications can be made to the drive without significant changes to the operation described above. For instance, the method may be applied to linear as well as rotating machines. The present invention is intended to be limited only by the scope of the following claims.

What is claimed is:

1. An electric machine system comprising a rotor, a rotor position transducer, and control means arranged to receive signals from the rotor position transducer and having first and second modes of operation that are different, wherein in the first mode the control means derives rotor position information from the signals from the rotor position transducer, and wherein in the second mode the control means derives rotor position information from a rotor position detection algorithm;

wherein the control means are operable to derive rotor position information from the signals for a first range of machine speeds, and to derive rotor position information from the rotor position detection algorithm for a second range of machine speeds; and wherein the first speed range is an upper speed range, and the second speed range is a lower speed range.

2. A system as claimed in claim 1, wherein the machine has at least two phases, and wherein for the second range of machine speeds the control means are operable to derive rotor position information simultaneously from the signals for at least one phase and from the rotor position detection algorithm for the remaining phase(s) of the machine.

3. A system as claimed in claim 2 in which the rotor position transducer comprises a single sensor responsive to movement of the rotor to produce the said signals indicative of the rotor position for a single phase of the machine.

4. A system as claimed in claim 3 in which a current sensor is arranged in relation to each phase to sense phase current except for the said single phase of the machine.

5. A system as claimed in claim 1 in which the speed ranges partially overlap.

6. A system as claimed in claim 1 in which the control means include processor means that are unable to derive rotor position information from signals from the position detection algorithm in at least a portion of the upper speed range.

7. A system as claimed in claim 1 in which the machine is a variable reluctance machine.

8. A method of deriving rotor position information in an electric machine comprising a rotor, a rotor position transducer, and control means having first and second modes of operation that are different, the method including:

receiving by the control means of signals from the rotor position transducer;

deriving in the control means during the first mode rotor position information from the signals; and deriving in the control means during the second mode rotor position information from a rotor position detection algorithm;

wherein the deriving of rotor position information from the signals is carried out for a first range of machine speeds, and the deriving of rotor position information from the rotor position detection algorithm is carried out for a second range of machine speeds; and including selecting the first speed range to be an upper speed range, and the second speed range to be a lower speed range.

9. A method as claimed in claim 8, wherein the machine has at least two phases, and wherein the deriving of rotor position information in the second mode for the second range of machine speeds includes simultaneously deriving rotor position information from the signals for at least one phase and deriving rotor position information from the rotor position detection algorithm for the remaining phase(s) of the machine.

10. A method as claimed in claim 8 including selecting the speed ranges so that they partially overlap.

11. A method as claimed in claim 8 in which the rotor position detector comprises a single sensor associated with a single phase of the machine, and including responding to movement of the rotor by producing from the sensor the signals indicative of the rotor position for the single phase of the machine.

12. A method as claimed in claim 11 including sensing phase current with a current sensor in each phase except for the single phase of the machine.

13. A method as claimed in claim 8 in which the control means includes a processor that is unable to derive rotor position information from signals from the rotor position detection algorithm in at least a portion of the upper speed range, and including carrying out the deriving of rotor position information in each of the first and second modes using the processor.

14. A method as claimed in claim 8 including configuring the electric machine to be a variable reluctance machine.

* * * * *

UNITED STATES PATENT AND TRADEMARK OFFICE
CERTIFICATE OF CORRECTION

PATENT NO. : 7,388,345 B2 Page 1 of 1
APPLICATION NO. : 11/522103
DATED : June 17, 2008
INVENTOR(S) : Michael Leo McClelland It is certified that error appears in the above-identified patent and that said Letters Patent is hereby corrected as shown below:

Column 3, line 22, change "defmed" to --defined--.

Signed and Sealed this

Twenty-sixth Day of August, 2008

JON W. DUDAS
*Director of the United States Patent and Trademark Office*